(12) United States Patent
Seradarian et al.

(10) Patent No.: US 8,876,222 B2
(45) Date of Patent: Nov. 4, 2014

(54) PROTECTOR SHIELD FOR A SIDEWALL OF A MOTOR VEHICLE TIRE, AND A WHEEL ASSEMBLY FOR SUCH A VEHICLE INCORPORATING IT

(75) Inventors: Pascal Seradarian, Princeton Junction, NJ (US); Charles Joseph Tabone, North Tonawanda, NY (US); Colin Gehris Vogel, Cheektowaga, NY (US); Eric Forster, Nerville la Forêt (FR); Larry K. Rogers, Bordentown, NJ (US); Olivier Noblanc, Philadelphia, PA (US); Benoit Le Rossignol, Saint Jean de Braye (FR)

(73) Assignee: Hutchinson Industries, Inc., Wilmington, DE (US)

( * ) Notice: Subject to any disclaimer, the term of this patent is extended or adjusted under 35 U.S.C. 154(b) by 907 days.

(21) Appl. No.: 12/486,404

(22) Filed: Jun. 17, 2009

(65) Prior Publication Data

US 2009/0315389 A1      Dec. 24, 2009

Related U.S. Application Data

(60) Provisional application No. 61/073,897, filed on Jun. 19, 2008.

(51) Int. Cl.
*B60B 7/01*      (2006.01)
*B60C 13/00*     (2006.01)

(52) U.S. Cl.
CPC ................. *B60C 13/002* (2013.04); *B60B 7/01* (2013.01)
USPC ................................ 301/37.22; 301/37.102

(58) Field of Classification Search
CPC ............ B60B 7/00; B60B 7/01; B60B 7/063; B60B 7/0026; B60B 7/0066; B60B 7/0093

USPC ................. 301/37.101, 37.102, 37.22, 37.34, 301/37.371; 152/513
See application file for complete search history.

(56) References Cited

U.S. PATENT DOCUMENTS

| 2,488,864 | A | * | 11/1949 | Handy | 152/410 |
| 2,696,409 | A | * | 12/1954 | Barnes | 301/37.22 |
| 3,784,520 | A | * | 1/1974 | Hoeschele | 528/301 |
| 4,235,271 | A | * | 11/1980 | Olsen et al. | 152/186 |
| 4,350,799 | A | * | 9/1982 | Schmelzer et al. | 525/453 |
| 4,397,986 | A | * | 8/1983 | Hornbaker | 525/64 |
| 4,790,362 | A | * | 12/1988 | Price | 152/153 |
| 4,859,741 | A | * | 8/1989 | Takahashi et al. | 525/123 |
| 6,271,301 | B1 | * | 8/2001 | Weng et al. | 524/527 |

FOREIGN PATENT DOCUMENTS

FR       2 919 223 A1    1/2009
WO    WO 2009/044012 A2    4/2009

* cited by examiner

*Primary Examiner* — Jason Bellinger
(74) *Attorney, Agent, or Firm* — Alston & Bird LLP

(57) ABSTRACT

The present invention relates to a protector shield for at least one sidewall of a motor vehicle tire, and to a wheel assembly for a motor vehicle incorporating this protector shield. The invention particularly but non exclusively concerns the fire protection against flames and/or said flammable substances, such as oil or Molotov cocktails, as well as a high solvent and/or acid resistance, especially in hostile environments. A protector shield of the invention is in a form of a curved ring designed to be mounted on a wheel rim receiving said tire and, according to the invention, the shield includes a fire protection part which defines an outer convex face of said shield and which comprises a cross-linked rubber composition which particularly exhibits flame retardant and heat resistance properties for imparting to said tire an improved fire protection against flames and/or flammable substances.

9 Claims, 4 Drawing Sheets

PROTECTOR SHIELD FOR A SIDEWALL OF A MOTOR VEHICLE TIRE, AND A WHEEL ASSEMBLY FOR SUCH A VEHICLE INCORPORATING IT

CROSS-REFERENCE TO RELATED APPLICATIONS

This application claims the benefit of U.S. Provisional Application No. 61/073,897, filed Jun. 19, 2008, which is hereby incorporated herein in its entirety by reference.

FIELD OF THE INVENTION

The present invention relates to a protector shield for at least one sidewall of a motor vehicle tire, and to a wheel assembly for a motor vehicle incorporating this protector shield. The invention particularly but non exclusively concerns the fire protection against flames and/or said flammable substances, such as oil or Molotov cocktails, as well as a high solvent and/or acid resistance, especially in hostile environments.

BACKGROUND OF THE INVENTION

U.S. Pat. No. 4,790,362 discloses a tire protector shield against penetration of the outer sidewall of the tire by solid foreign objects, which is mounted between the wheel rim and this sidewall while covering the latter. This shield has opposed outer convex and inner concave sides which have a radius of curvature smaller than that of the sidewall thus providing a significant space between the shield and this outer sidewall. More precisely, this shield has a central embedded core made of a hard penetration resistant rubber layer which is covered with a penetration resistant fabric layer. This patent does not relate to the fire protection of the tire against flames nor against flammable substances.

There is thus a continuing need for providing such a fire protector shield which should exhibit flame retardant and heat resistance properties for particularly imparting to a motor vehicle tire an improved fire protection against flames and/or flammable substances.

OBJECTS AND SUMMARY OF THE INVENTION

It is an object of the present invention to provide a protector shield for at least one sidewall of a motor vehicle tire with enhanced fire protection for vehicle tires particularly when exposed to flames and/or flammable substances, particularly in the event of hostile environments that could involve unexpected enemy attacks, thus providing escapability of the vehicle whose tires are exposed to extreme fire conditions such as exposure to Molotov cocktails or other highly flammable materials.

It is also an object of the present invention to provide such a protector shield with a satisfactory solvent and/or acid resistance.

It is a further object of the present invention to provide such a shield that is designed to be sufficiently strong and robust to enable use in combat environments where durability compliments the shield's fire retardancy.

For this purpose, the shield of the invention is in a form of a curved ring designed to be mounted on a wheel rim receiving said tire, and this shield includes a fire protection part which defines an outer convex face of said shield and which comprises a cross-linked rubber composition which particularly exhibits flame retardant and heat resistance properties for imparting to said tire an improved fire protection against flames and/or flammable substances.

According to another feature of the invention, said outer face of the shield may further advantageously exhibit anti-sticking properties to flammable substances, such as oil.

It will be noted that the shield according to the invention is suitable to protect one or both sidewalls of each tire in particular from the effects of burning fuels placed or splashed against the or each sidewall surface of the tires for durations that may range from 5 to 15 minutes. In fact, this increased fire retardancy may allow the vehicle to escape from hostile environments before its tires are rendered unusable and the vehicle unable to move.

It is also to be noted that the shield according to the invention is further suitable to protect one or both sidewalls of each tire from the effects of acids and/or solvents.

It will be noted that said rubber composition may be either colored or not, for instance for camouflage purposes.

Preferably, said rubber composition exhibits a Shore A hardness greater than 50, and preferably greater than 60.

According to an exemplary embodiment of the invention, said rubber composition for the fire protection part may comprise reinforcing short fibers which are dispersed in this composition and are designed to enhance the rigidity of the shield and also preferably the perforation resistance thereof. By way of example of such usable short fibers, one may cite cellulose, Nylon®, aramide or aromatic copolyamides such as Technora® fibers.

According to a first embodiment of the invention, the shield further comprises a substrate part defining an inner concave face of said shield and exhibiting high tensile strength and flexural properties. In this case, the shield thus exhibits a composite structure (e.g. an at least dual laminate composite) with this substrate or support part covering—either directly or not—said fire protection part.

It is to be noted that these properties for said substrate part provide the required rigidity and strength to allow the mounting of this shield onto the wheel assembly.

In an advantageous example of this first embodiment, this substrate part is based on at least one elastomer in which reinforcing short fibers (such those above-recited) are dispersed to enhance the rigidity of the shield and also the perforation resistance thereof.

According to another example of this first embodiment, said substrate part is based on a prepreg (i.e. a pre-impregnated) of a thermosetting resin and of an organic or inorganic reinforcement, this prepreg being embedded in at least one elastomer in this substrate part and being designed to enhance the rigidity of the shield and preferably the perforation resistance thereof. As an example of usable thermosetting resins, one may cite an epoxy resin or any other suitable one such as a phenolic resin, for instance. As en example of reinforcement usable in this prepreg, one may cite fiberglass or any other fibers suitable for that purpose of rigidity and perforation resistance enhancement. More preferably, the substrate part is made of a prepreg of an epoxy resin and fiberglass (i.e. an epoxy impregnated glass cloth).

According to still another example of this first embodiment, said substrate part is based on at least one thermoplastic polymer (e.g. a polyamide) reinforced by means of fibers such as a fabric or a fiberglass mat, for instance.

In a variant example of this first embodiment:
said substrate part is based on a thermoplastic copolyester (COPE), such as that sold under the trade name Hytrel®, and preferably exhibits a Shore D hardness of between 50 and 60. More advantageously, said substrate part is made of said thermoplastic copolyester (COPE) and has a thickness greater than or equal to 0.0625", and said fire protection part may be made of said cross-linked rubber composition, thus being a thermo-set outer shell, which preferably exhibits a Shore A hardness of between 70 and 90 and is preferably based on at least one thermo-set silicone or polysiloxane elastomer (which is even more preferably a silicone sold by the Wacker Company), or on a polyurethane elastomer (PUR).

In this last most preferred case relating to either a silicone or polyurethane elastomer for the fire protection part, this part may have a thickness greater than or equal to 0.12", this minimum value being designed for optimal performance without an excessive weight.

In a variant example of the invention, a metallic substrate part may be used in place of this thermoplastic copolyester (COPE), in combination with said rubber composition for the fire protection part. Such a metallic substrate may for instance have a thickness of about 0.8 mm.

With this advantageous use of a high durometer thermo-set silicone or polyurethane (preferably of 70-90 Shore A) for the fire protection part, an improved oil resistance and oil-shedding ability of the shield is obtained. Such a silicone elastomer may be of the HCR type (Heat Cure Rubber, or platinum Catalyst thermo-set), which also exhibits an excellent heat resistance over extended durations (700-800° F. for up to 10 hours) and thus provides the needed flame resistance. It may further be noted that such cross-linked elastomers for the protection part of the shield do not melt but degrade slowly in these extreme situations, which further extends the duration of this shield.

Besides, one may note that the thermoplastic copolyester (COPE, such as Hytrel®) preferably used for said substrate part has the inherent ability to cohesively be bonded to such a silicone elastomer via an overmolding or co-molding process. As a consequence of this excellent cohesive bonding, the protection part of the shield is able to maintain its shielding function and shape even when damaged, slit, torn or otherwise disturbed.

Such a thermoplastic copolyester for the substrate part can be vacuum molded, compression molded, injection molded, low-pressure molded, cold-formed or sheared into the required shape, which provides significant economic advantages in the manufacturing process. Moreover, this either thermoplastic copolyester or metallic substrate part significantly enhances the strength of the shield.

One should note that a different material (other than a thermoplastic copolyester or metal) could be used for said substrate part of this first embodiment of the invention, provided that it exhibits a satisfactory flexural modulus, allows a cohesive bonding, has a similar or greater compression set compared to that of Hytrel®, for instance, and preferably exhibits the same ease of manufacture to assist in economic viability.

In another variant of this first embodiment, said fire protection part is based on a thermoplastic vulcanizate (TPV), such as Santoprene® for instance.

It will be noted that said substrate part thus provides the strength and rigidity needed to facilitate the mounting of said at least one shield to the wheel assembly, and that said fire protection part provides the above-recited enhanced flame retardant properties and high heat resistance as well as durability and the ability to repel or shed sticky or tar-like flammable materials, mainly.

Also advantageously, the protector shield may further comprise a reinforcing layer which is inclusively between said substrate part and said fire protection part (i.e. which may be located in the substrate part, in the fire protection part or between both parts), and this reinforcing layer may be selected from the group consisting of a mat or mesh of woven or nonwoven fabric, a fiberglass mat or mesh and a metal layer (e.g. a metal sheet). This reinforcing layer allows to enhance the product even further (approximately +20%), not only in terms of added product longevity when subject to flames, but also in terms of puncture resistance from stabbing, "shrapnel" and other such obstructions.

In a variant of this first embodiment, said substrate part may have a composite structure comprising an inner rubber layer based on at least one elastomer, preferably a polychloroprene, and at least one reinforcing layer such as a mat or mesh of a woven or nonwoven fabric (e.g. based on a polyamide or polyester woven fabric), a fiberglass mat or mesh or a metal layer (e.g. a metal sheet).

It should be noted that the inventive selection of materials for both substrate and protection parts allows to provide the ability for the shield to bend, twist and otherwise absorb abrasive energies that a tire typically experiences during high speed and off-road travel, thus allowing the shield of the invention to resist damages when impacted by road hazards such as rocks, stone, tree limbs, mud, etc., and extending the global performance of the inventive shield.

According to a second embodiment of the invention, the protector shield is integrally formed of said protection part which comprises said cross-linked rubber composition and optionally one or several reinforcing layer(s) for instance made of fabric (e.g. of polyamide or polyester), of fiberglass or of metal (e.g. at least one metal sheet), said composition having flame retardant and/or intumescent properties. As a result of this intumescent nature of the rubber composition, elevated temperatures cause the latter to decompose to form bubbles of gas or of vapour, such as steam, thus causing the rubber layer to swell and to char. The resulting expanded char provides a good thermal insulation for the shield and also a protection for the optional underlying substrate part.

More precisely, said composition is then preferably based on at least one elastomer and may further comprise:
(phr: parts by weight per hundred parts of elastomer(s))
from 1 to 50 phr of a catalyst or foaming agent,
from 1 to 50 phr of a charring agent,
from 1 to 55 phr of a blowing agent,
from 1 to 100 phr of a fire retardant additive, and
from 5 to 15 phr of a smoke suppressant additive, and
from 7 to 50 phr of a fire barrier additive.

In this second embodiment, said elastomer is preferably selected from the group consisting of polychloroprenes, natural rubber, polyisoprenes, ethylene-propylene-diene terpolymers, ethylene-propylene copolymers, ethylene-vinyl acetate, chlorinated polyethylene, chorosulfonated polyethylene, and mixtures thereof.

Also in this second embodiment:
exemplary foaming agents are mono-ammonium phosphate, diammonium phosphate, ammonium polyphosphate, potassium tripolyphosphate and combinations thereof;
exemplary charring agents are pentaerythritol, dipentaerythritol and polyols;
exemplary blowing agents are melamine, urea and dicyandiamide chlorinated paraffin;
exemplary fire retardant additives are aluminum trihydroxide, magnesium hydroxide (synthetic or natural brucite) or any other thermally decomposable magnesium containing mineral such as huntite or hydromagnesite, zinc borate, antimony trioxide and tin oxide;

exemplary smoke suppressant additives are molybdenum trioxide, ammonium octamolybdate, iron oxide and ferrocene; and exemplary fire barrier additives are glass frits such as Ceepree®, sodium silicate and inorganic glasses.

According to another aspect of the invention relative to the above mentioned anti-sticking properties to flammable substances of the outer face of the shield, said outer face may be made of an anti-sticking thin film (for instance similar to a gloss) either based on a silicone elastomer or alternatively on a fluorinated polymer, such as a polytetrafluoroethylene (e.g. Teflon®), said film either coating or being bonded to a substrate part of the shield defining an inner concave face of said shield and exhibiting high tensile strength and flexural properties.

According to another optional feature of the invention, the protector shield may advantageously further comprise an anti-abrasion layer either located on said outer convex face or embedded in said fire protection part, this anti-abrasion layer being for instance selected from the group consisting of an abrasion resistant rubber (such as a polyurethane rubber), a mesh or mat of fabric or of fiberglass, and a metal layer.

According to still another optional feature of the invention which may be combined to any of the following ones, the protector shield may advantageously further comprise at least one anti-perforation element selected from the group consisting of a fabric (e.g. a polyester fabric, a Kevlar®, a Dyneema® or a fiberglass fabric) impregnated or not with a thermosetting resin (e.g. an epoxy resin), an anti-perforation metal sheet (which is preferably made of an austenitic stainless steel which has been cold rolled and aged, or of an amorphous metal or metal alloy such as a metallic glass, as mentioned in French Patent Application FR0705467) and a metal mesh or braid.

According to a preferred additional feature of the invention, the shield may further comprise at its radially outer end a bead having an increased thickness, which is designed to delay the abrasion of the shield in case the latter is in contact with the ground.

A wheel assembly for a motor vehicle according to the present invention comprises a wheel rim, a tire having beads mounted respectively against axially inner and outer flanges of said rim, and at least one protector shield which is mounted on said rim.

In this wheel assembly, said at least one shield is in a form of a curved ring extending along at least a part of the radial height of the corresponding sidewall—preferably the outer sidewall of said tire (for instance extending substantially along its entire radial height or only a part thereof), and including a fire protection part which defines an outer convex face of said shield and which comprises a cross-linked rubber composition which particularly exhibits flame retardant and heat resistance properties as well as anti-sticking properties to flammable substances, for imparting to said tire an improved fire protection against flames and/or said flammable substances.

According to a preferred feature of this wheel assembly which refers to the above mentioned first embodiment of the invention, said at least one shield comprises:

an inner substrate part defining an inner concave face of said shield and exhibiting high tensile strength and flexural properties, and an outer fire protection part comprising a cross-linked rubber composition particularly exhibiting flame retardant and heat resistance properties, said substrate part having a radially inner end portion extending radially below that of said protection part, said shield being clamped between said outer bead and said axially outer rim flange by said radially inner end portion.

According to a variant feature of this wheel assembly, the shield may be advantageously be according to the above mentioned second embodiment of the invention, the protector shield being integrally formed of said protection part which comprises said cross-linked rubber composition and optionally one or several reinforcing layer(s) for instance made of fabric (e.g. of polyamide or polyester), of fiberglass or of metal (e.g. at least one metal sheet).

Advantageously, the radius of curvature of said at least one shield is smaller than that of said or each sidewall, said shield being designed so as to be not in contact with this sidewall radially above said corresponding flange. According to this embodiment, the minimum distance between the deformed sidewall (under any inflation condition) and the inventive shield is always equal to or greater than 1 mm.

It is to be noted that this space between the shield and the sidewall allows, as an air barrier, to make this shield and the whole wheel assembly less detectable by infrared waves than without such a shield.

BRIEF DESCRIPTION OF THE DRAWINGS

Other advantages, characteristics, and details of the invention appear from the following additional description with reference to the accompanying drawings, given purely by way of example, and in which.

MORE DETAILED DESCRIPTION

Figure 1:
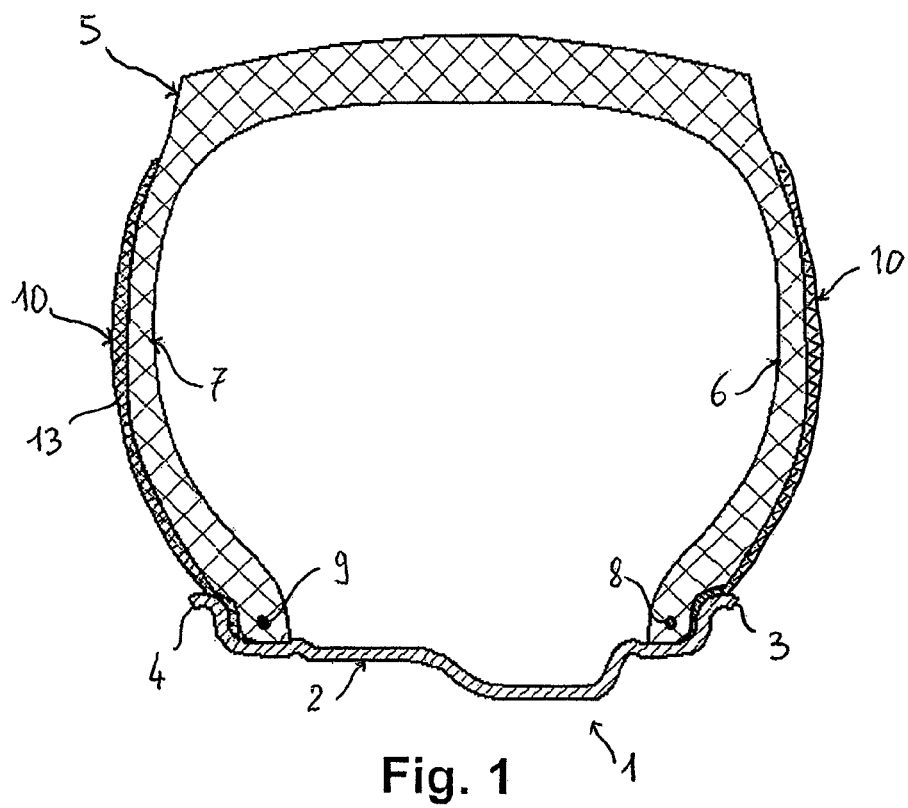
FIG. 1 is a fragmentary and diagrammatic half-view in axial section of a wheel assembly incorporating a protector shield of the invention.
Figure 2:
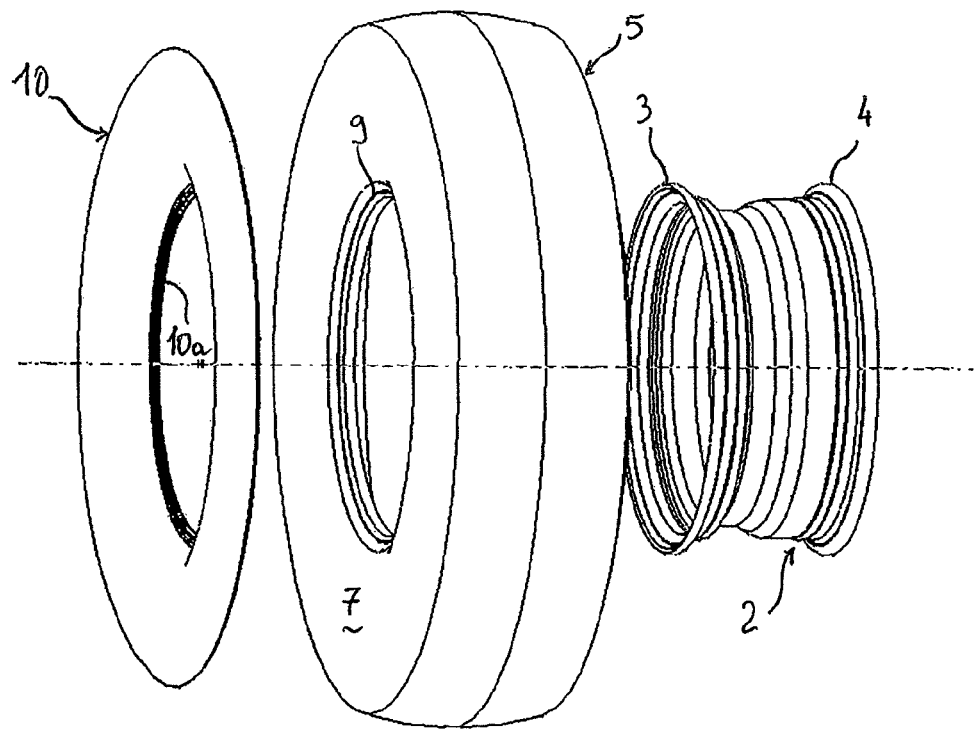
FIG. 2 is a diagrammatic exploded view of the wheel assembly of FIG. 1.

The wheel assembly 1 according to the exemplary embodiment of the invention shown in FIGS. 1 and 2 comprises:

a metallic wheel rim 2 which is in this example of the single piece type and which comprises axially inner and outer flanges 3 and 4 defining respective seats, a tire 5 having two sidewalls 6 and 7 ending with inner and outer beads 8 and 9 respectively mounted against the inner and outer flanges 3 and 4, and a pair of protector shields 10 in the form of a curved ring which is circumferentially inserted between the bead 9 and the outer flange 4 so as to substantially extend along the entire radial height of the corresponding sidewall 7 and which is retained in this position by a pushing force due to inflation of the tire 5.

Figure 3:
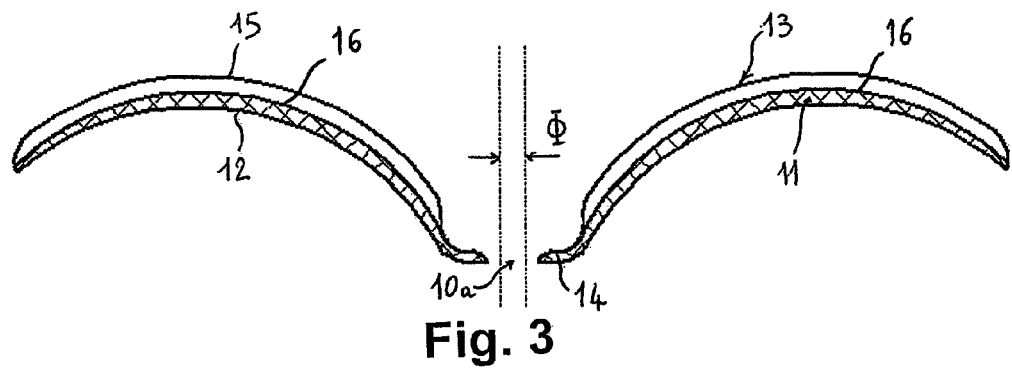
FIG. 3 is a diagrammatic view in axial section of the protector shield of FIGS. 1 and 2.

As visible in FIG. 3, the shield 10 comprises:

an inner substrate part 11 defining an inner concave face 12 of the shield 10 and exhibiting high tensile strength and flexural properties, and an outer fire protection part 13 comprising a cross-linked rubber composition particularly exhibiting flame retardant and heat resistance properties (as well as a high resistance to acids and solvents).

Additionally, the shield 10 may comprise at least one reinforcing layer 16 which is inclusively between the inner substrate part 11 and the outer fire protection part 13 and which in the exemplary embodiment of FIG. 3 is located between both parts 11 and 13.

More precisely, the substrate part 11 has a radially inner end portion 14 extending radially below that of the protection part 13, and the shield 10 is preferably clamped between the bead 9 and the outer flange 4 by this portion 14. As for the radius of curvature of the shield 10, it is substantially identical to that of the sidewall 7, so that the shield 10 substantially covers the latter by its concave face 12.

As an example, the respective thicknesses of the substrate part 11 and of the protection part 13 may be as low as 0.0625" and 0.1875", in the preferred embodiment where the substrate part 11 is based on a thermoplastic copolyester sold under the trade name Hytrel® (with a Shore D hardness of between 50 and 60) and where the protection part 13 is based on a thermoset silicone supplied by the Wacker Company (with a Shore A hardness of between 70 and 80). As a consequence, the total thickness of such a preferred shield 10 according to the invention may be as low as 0.25", from its convex face 15 to its concave face 12.

As also visible in FIG. 3, the outer diameter Φ of the wheel rim, to which substantially corresponds the inner diameter of the circular central hole 10a of the shield 10, may be of 16", 17", 18" or even more, for instance.

This inventive shield 10 may be easily assembled to the tire/rim sub-assembly by inserting the inner end portion 14 of the shield 10 between the tire 5 and the rim 2 prior to the tire inflation. Upon inflation, the tire 5 increases in size and pushes the entire assembly 1 into position (see FIG. 1). The assembly 1 is thus tightly held in position and further reinforces the airtight seal of the bead 9. The completed assembly 1 can be balanced and mounted using conventional methodology.

The disassembly of the shield 10 may be achieved by reducing the air-pressure of the tire 5 to 10 psi. Upon this lowered pressure, the shield 10 can be pulled by hand and removed with a minor level of resistance.

Figure 4:
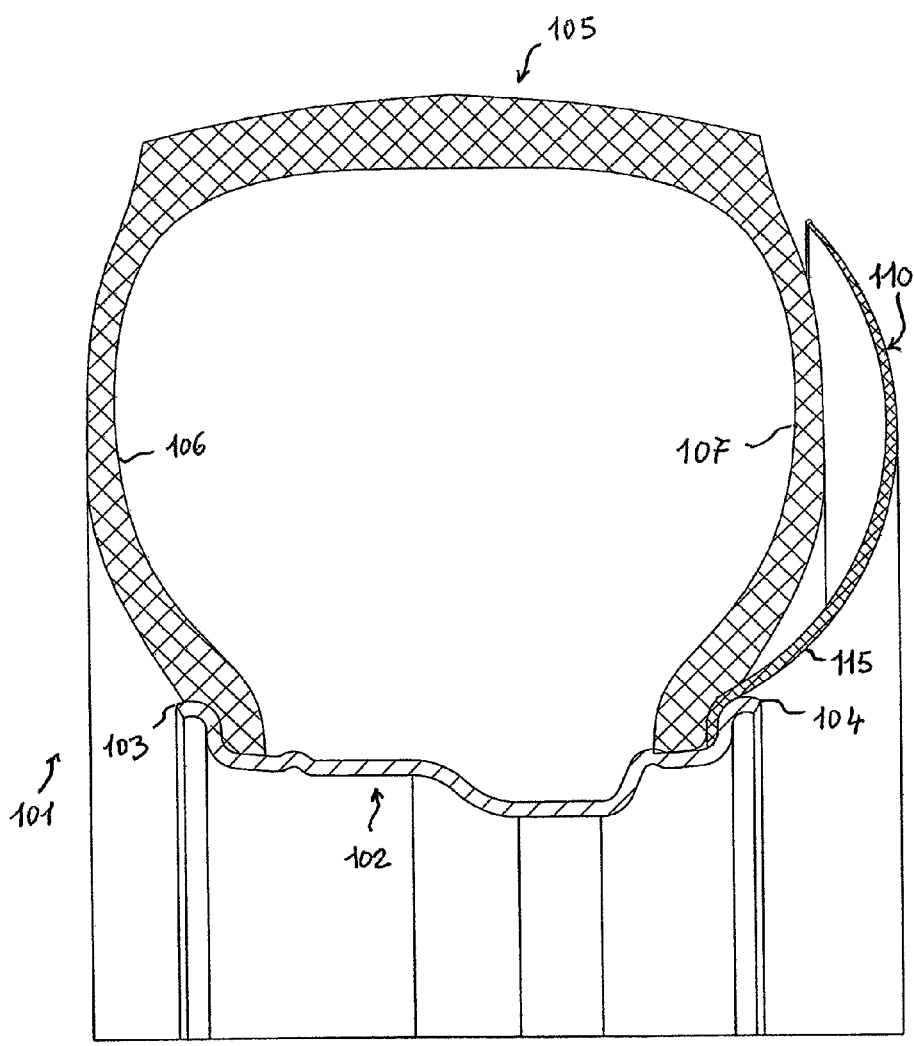
FIG. 4 is a half-view in axial section of a wheel assembly incorporating a protector shield of the invention, according to a preferred variant embodiment of that of FIG. 1.

The alternative embodiment of the wheel assembly 101 shown in FIG. 4 mainly differs from that of FIG. 1, in that the shield 110 is never in contact with the tire sidewall 107 radially above the corresponding flange 104 of the wheel rim 102 on which the tire 105 is mounted (the other flange 103 of the wheel rims 102 devoid of that 110 shield receiving the other tire sidewall 106). According to this embodiment, the minimum distance between the deformed sidewall 107 and the shield 110 is always equal to or greater than 1 mm, whatever the inflation conditions be. More precisely and as visible in FIG. 4, this distance may continuously increase from the flange 104 to reach a maximum value (for example of several mm) substantially at mid-height of the sidewall 107, due to the higher convexity (i.e. smaller radius of curvature) of the outer face 115 of the shield 110 compared to that of the sidewall 107, and this distance then slightly decreases while remaining at a sufficient distance from the radially outer part of the sidewall 107, so as to avoid any damageable contact with the tire 105.

Figure 5:
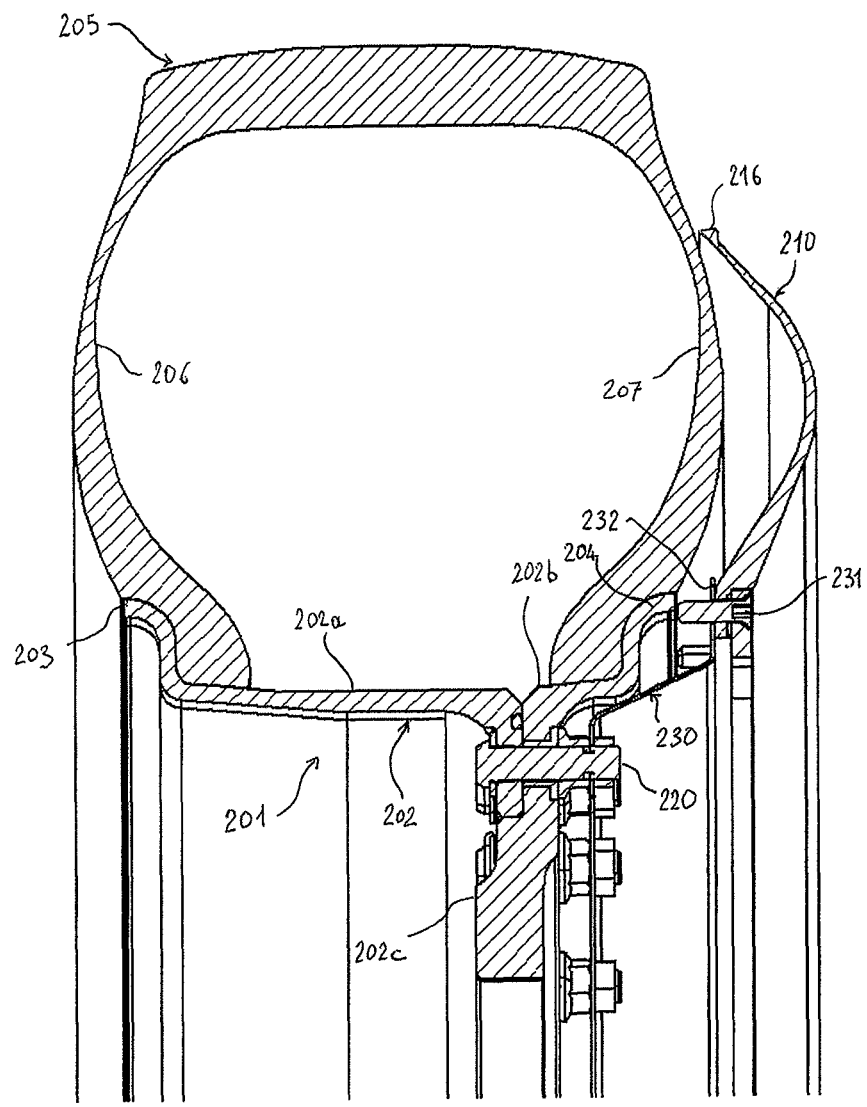
FIG. 5 is a half-view in axial section of a wheel assembly incorporating a protector shield of the invention, according to a still another variant embodiment.

In the other alternative embodiment of the wheel assembly 201 shown in FIG. 5, the wheel rim 202 having two flanges 203 and 204 receiving the tire 205 is a two pieces 202a and 202b one, both pieces being fixed together in a junction zone 202c of the rim 202 by circumferentially spaced rim bolts 220, in a known manner. The shield 210 is fixed by supporting bolts 231 to a radially outer end 232 of a circonferential support 230 (substantially disk-like) which is itself attached to the pieces 202a and 202b in this very junction zone 202c. As visible in FIG. 5, the radius of curvature of the shield 210 is smaller than that of each sidewall 206, 207 of the tire 205, and this support outer end 232 extends axially outside the corresponding rim flange 204. In other words, the shield 210 is not mounted in contact with the rim 202.

Besides, this shield 210 preferably terminates at its radially outer end with a bead 216 having an increased thickness, so as to delay the abrasion of the shield 210 with the ground.

It is to be noted that a shield 210 according to the embodiment of FIG. 5 could alternatively be mounted on a wheel rim of the single piece type, the shield support 230 being in this case bolted to the wheel hub, for instance.

Figure 6:
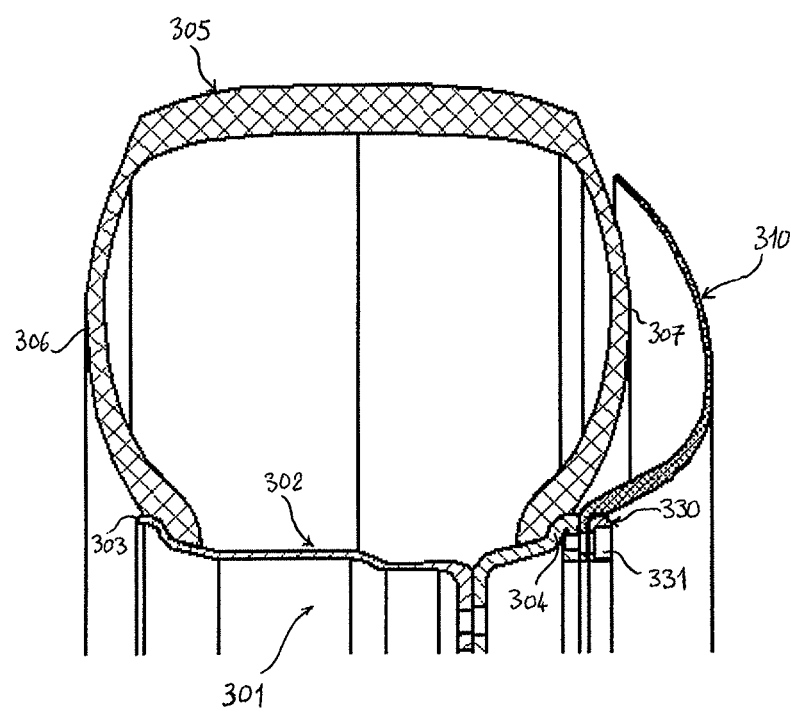
FIG. 6 is a half-view in axial section of a wheel assembly incorporating a protector shield of the invention, according to a still another variant embodiment.

In the last alternative embodiment of the wheel assembly 301 shown in FIG. 6, the shield 310 is fixed to the corresponding flange 304 of the wheel rim 302 adjacent the tire sidewall 307 by means of an annular insert 330 which is attached to this flange 304 by a plurality of circumferentially spaced rim bolts 331, so that a radially inner end of the shield 310 is located between and in contact with the flange 304 and the insert 330 which is thus mounted axially outside the flange 304. More precisely, this insert 330 which is preferably metallic may be either inserted during the mounting step of the shield 310 on the rim 302, or overmolded during the molding step of the shield 310. As visible in FIG. 6, both flange 304, shield 310 and insert 330 exhibit circumferentially spaced through holes for receiving the bolts 331, which each extend from the insert 330 to the flange 304 (the other flange 303 receiving the other tire sidewall 306).

One should note that this insert 330 may be formed either by a single ring or by a plurality of ring sectors that are circumferentially juxtaposed end to end to obtain such a ring.

What is claimed is:

1. A wheel assembly for a motor vehicle comprising a multi-piece wheel rim comprising two pieces a tire having beads mounted respectively against axially inner and outer flanges of said rim, and at least one protector shield in a form of a curved ring which is mounted on said rim to protect at least one sidewall of the tire and which extends along at least a part of the radial height of said at least one sidewall, wherein said shield includes a fire protection part which defines an outer convex face of said shield and which comprises a cross-linked rubber composition which exhibits flame retardant and heat resistance properties for imparting to said tire a fire protection against flames and flammable substances, said shield being integrally formed of said fire protection part which consists of said cross-linked rubber composition and optionally of at least one reinforcing layer made of fabric, fiberglass or metal, and wherein said shield is fixed to a radially outer end of a circumferential support which is attached to said pieces of said wheel rim in a junction zone of said pieces, said radially outer end of the support extending axially outside said rim so that said shield is not in contact with the rim.

2. A wheel assembly according to claim 1, wherein said at least one shield comprises:

an inner substrate part defining an inner concave face of said shield and exhibiting tensile strength and flexural properties, and an outer fire protection part comprising a cross-linked rubber composition exhibiting flame retardant and heat resistance properties, said substrate part having a radially inner end portion extending radially below that of said protection part, said shield being clamped between said bead and the corresponding rim flange by said end portion.

3. A wheel assembly according to claim 1, wherein the radius of curvature of said at least one shield is smaller than that of the corresponding sidewall, said shield being designed so as not to be in contact with this sidewall radially above said corresponding flange.

4. A wheel assembly according to claim 1, wherein said at least one shield is fixed to the corresponding flange of said wheel rim by means of an annular insert which is attached to said flange, so that a radially inner end of the shield is located between and in contact with said flange and said insert.

5. A wheel assembly according to claim 1, wherein said pieces are fixed together in said junction zone by circumferentially spaced rim bolts, and wherein said shield is fixed by supporting bolts to said radially outer end of said support.

6. A wheel assembly according to claim 1, wherein said rubber composition exhibits a Shore A hardness greater than 50.

7. A wheel assembly according to claim 1, wherein said rubber composition comprises reinforcing short fibers, which are dispersed in this composition.

8. A wheel assembly according to claim 1, wherein said rubber composition is based on at least one elastomer and further comprises: (phr: parts by weight per hundred parts of elastomer(s)) from 1 to 50 phr of a foaming agent,
from 1 to 50 phr of a charring agent,
from 1 to 55 phr of a blowing agent,
from 1 to 100 phr of a fire retardant additive, and
from 5 to 15 phr of a smoke suppressant additive, and
from 7 to 50 phr of a fire barrier additive.

9. A wheel assembly according to claim 1, wherein said elastomer is selected from the group consisting of polychloroprenes, natural rubber, polyisoprenes, ethylene-propylene-diene terpolymers, ethylene-propylene copolymers, ethylene-vinyl acetate, chlorinated polyethylene, chorosulfonated polyethylene, and mixtures thereof.

\* \* \* \* \*